United States Patent
Kim et al.

(10) Patent No.: US 9,837,854 B2
(45) Date of Patent: Dec. 5, 2017

(54) UNINTERRUPTIBLE POWER SUPPLY SYSTEM

(71) Applicant: POSCO, Pohang-si (KR)

(72) Inventors: Jun-Su Kim, Gwangyang-si (KR); Byeong Gwon Park, Gwangyang-si (KR); Hyun Seong Kim, Suncheon-si (KR); Tae Yeol Kwon, Gwangyang-si (KR)

(73) Assignee: POSCO, Pohang-si (KR)

( * ) Notice: Subject to any disclaimer, the term of this patent is extended or adjusted under 35 U.S.C. 154(b) by 336 days.

(21) Appl. No.: 14/416,876

(22) PCT Filed: Dec. 28, 2012

(86) PCT No.: PCT/KR2012/011671
§ 371 (c)(1),
(2) Date: Jan. 23, 2015

(87) PCT Pub. No.: WO2014/017713
PCT Pub. Date: Jan. 30, 2014

(65) Prior Publication Data
US 2015/0214780 A1     Jul. 30, 2015

(30) Foreign Application Priority Data

Jul. 24, 2012 (KR) .................. 10-2012-0080728

(51) Int. Cl.
*H02J 9/00* (2006.01)
*H02J 9/06* (2006.01)

(52) U.S. Cl.
CPC .............. *H02J 9/061* (2013.01); *H02J 9/062* (2013.01); *H02J 2009/068* (2013.01); *Y10T 307/62* (2015.04)

(58) Field of Classification Search
CPC ...... H02J 9/061; H02J 9/062; H02J 2009/068; Y10T 307/62
USPC .......................................................... 307/10.2
See application file for complete search history.

(56) References Cited

FOREIGN PATENT DOCUMENTS

| CN | 201107838 Y | 8/2008 |
|---|---|---|
| CN | 102066906 A | 5/2011 |
| JP | 2000341881 | * 12/2000 |
| JP | 2000341881 A | 12/2000 |

(Continued)

*Primary Examiner* — Rex Barnie
*Assistant Examiner* — Toan Vu
(74) *Attorney, Agent, or Firm* — The Webb Law Firm

(57) ABSTRACT

Disclosed is an uninterruptible power supply system, including a sub power supply device configured to supply or cut off sub input power to a load device; a battery configured to supply or cut off battery input power to the load device; and an uninterruptible power supply device that is electrically connected to the sub power supply device and the battery, and when main input power is selectively received and supplied to the load device or the battery input power is selectively received and supplied to the load device, determines whether the main input power and the battery input power are within a predetermined reference main input power range and reference battery input power range, and when the main input power and the battery input power are outside of the reference main input power range and the reference battery input power range, receives the sub input power and supplies the power to the load device.

6 Claims, 6 Drawing Sheets

(56) References Cited

FOREIGN PATENT DOCUMENTS

| | | | |
|---|---|---|---|
| JP | 2008237018 | A | 10/2008 |
| KR | 10-2005-0088107 | A | 9/2005 |
| KR | 10-2009-0036751 | A | 4/2009 |
| KR | 10-2010-0125758 | A | 12/2010 |
| KR | 101029249 | B1 | 4/2011 |
| KR | 10-2011-0112678 | A | 10/2011 |
| KR | 20110112678 | A | 10/2011 |

* cited by examiner

UNINTERRUPTIBLE POWER SUPPLY SYSTEM

CROSS-REFERENCE TO RELATED APPLICATIONS

This application is the United States national phase of International Application No. PCT/KR2012/011671 filed Dec. 28, 2012, and claims priority to Korean Patent Application No. 10-2012-0080728, filed on Jul. 24, 2012, the disclosures of which are hereby incorporated in their entirety by reference.

BACKGROUND

1. Field

Embodiments of the present invention relate to an uninterruptible power supply system.

2. Description of the Related Art

In general, an uninterruptible power supply device was provided to stably supply power to a load device by receiving sub input power even when main input power is output as abnormal input power.

Recently, research on an improved uninterruptible power supply system in which power is stably supplied to the load device, an abnormal situation of the uninterruptible power supply device is quickly identified when an abnormal situation of the uninterruptible power supply device occurs so that a maintenance time of the uninterruptible power supply device decreases and an increase in a maintenance cost is suppressed has been continuously conducted.

SUMMARY

The present invention provides an uninterruptible power supply system capable of stably supplying power to a load device by receiving sub input power even when main input power and battery input power output from an uninterruptible power supply device are output as abnormal input power.

The present invention also provides an uninterruptible power supply system capable of identifying an abnormal situation of current input power output from an uninterruptible power supply device, decreasing a maintenance time of the uninterruptible power supply device, and suppressing an increase in a maintenance cost.

According to an aspect of the present invention, there is provided an uninterruptible power supply system, including: a sub power supply device configured to supply or cut off sub input power to a load device; a battery configured to supply or cut off battery input power to the load device; and an uninterruptible power supply device that is electrically connected to the sub power supply device and the battery, and when main input power is selectively received and supplied to the load device or the battery input power is selectively received and supplied to the load device, determines whether the main input power and the battery input power are within a predetermined reference main input power range and reference battery input power range, and when the main input power and the battery input power are outside of the reference main input power range and the reference battery input power range, receives the sub input power and supplies the power to the load device.

The uninterruptible power supply device may include: a main switching unit configured to selectively provide the main input power or the battery input power; an input power determining unit configured to determine whether the main input power or the battery input power output from the main switching unit is outside of the reference main input power range or the reference battery input power range; a driving operation power supplying unit electrically connected to the input power determining unit and configured to supply driving operation power to the input power determining unit; an input power output unit that is electrically connected to the input power determining unit, and when main input power or battery input power is determined by the input power determining unit to be within the reference main input power range or the reference battery input power range, selectively provides the main input power or the battery input power to the load device by a switching turn on operation of the main switching unit when; and a sub switching unit that is electrically connected to the sub power supply device and the input power determining unit, and when main input power and battery input power are determined by the input power determining unit to be outside of the reference main input power range and the reference battery input power range and the input power determining unit provides a switching turn off signal to the main switching unit, receives a switching turn on signal from the input power determining unit, performs a switching turn on operation, and provides the sub input power supplied from the sub power supply device to the load device through the input power output unit.

The main switching unit may include a main static switch configured to selectively provide the main input power; and a first driving element electrically connected to the main static switch and configured to drive such that a switching turn on signal is selectively provided to the main static switch.

The input power determining unit may include an input power detecting element electrically connected to the main switching unit and configured to detect the main input power or the battery input power output from the main switching unit; and an input power determining element electrically connected to the input power detecting element and configured to determine whether the main input power and the battery input power detected by the input power detecting element are outside of the reference main input power range and the reference battery input power range.

The sub switching unit may include a second driving element that is electrically connected to the sub power supply device and the input power determining unit, and when the main input power and the battery input power are determined by the input power determining unit to be outside of the reference main input power range and the reference battery input power range and the input power determining unit provides a switching turn off signal to the main switching unit, drives such that a switching turn on signal is received from the input power determining unit and a switching turn on operation is performed; and a sub static switch that is electrically connected to the sub power supply device and the second driving element, performs a switching turn on operation by driving of the second driving element, and provides the sub input power supplied from the sub power supply device to the load device through the input power output unit.

The sub static switch may be connected in parallel with the main switching unit in a redundant manner.

The system may further include an identifying unit that is electrically connected to the input power determining unit, and when at least one of the main input power and battery input power is determined by the input power determining unit to be outside of at least one range of the reference main input power range and the reference battery input power range, identifies an abnormal situation of current input power.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, exemplary embodiments of the present invention will be described in detail with reference to the accompanying drawings.

Figure 1:
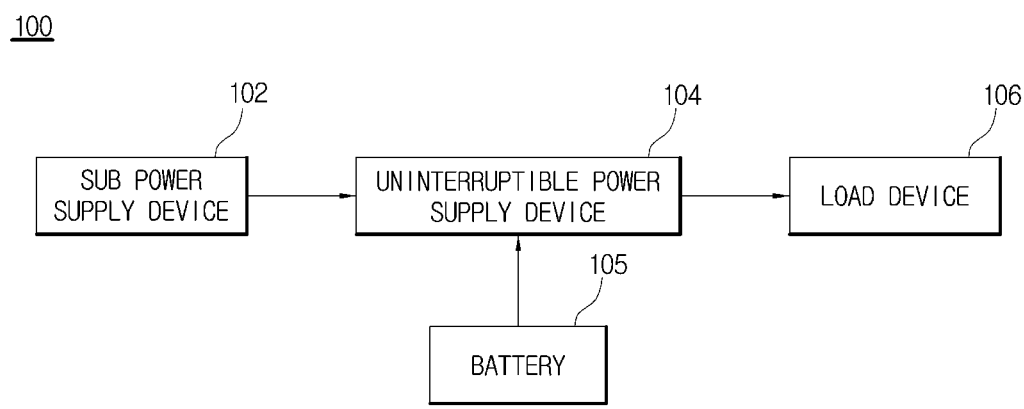
FIG. 1 is a block configuration diagram illustrating an uninterruptible power supply system according to an embodiment of the present invention.
Figure 2:
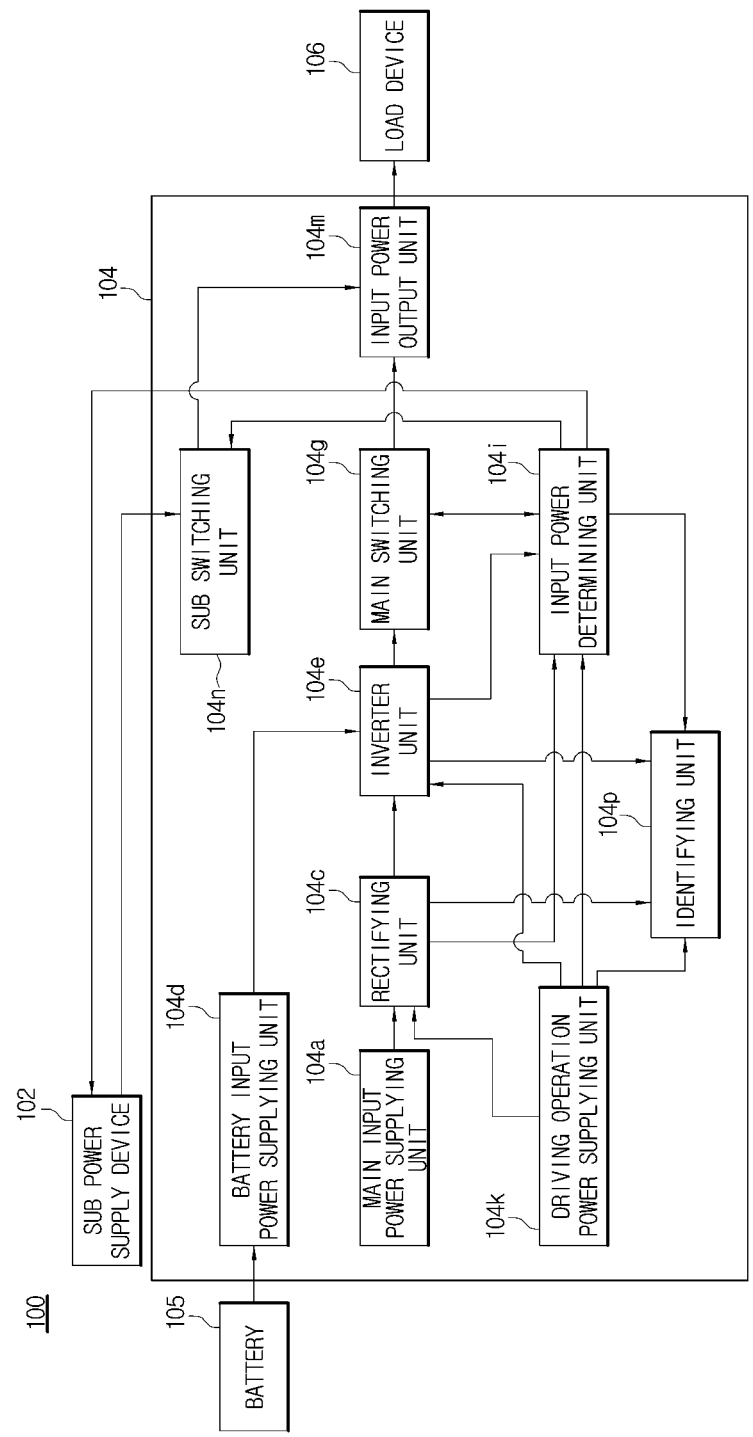
FIG. 2 is a block configuration diagram illustrating an exemplary uninterruptible power supply system according to an embodiment of the present invention.

FIG. 1 is a block configuration diagram illustrating an uninterruptible power supply system according to an embodiment of the present invention. FIG. 2 is a block configuration diagram illustrating an exemplary uninterruptible power supply system according to an embodiment of the present invention.

Figure 3:
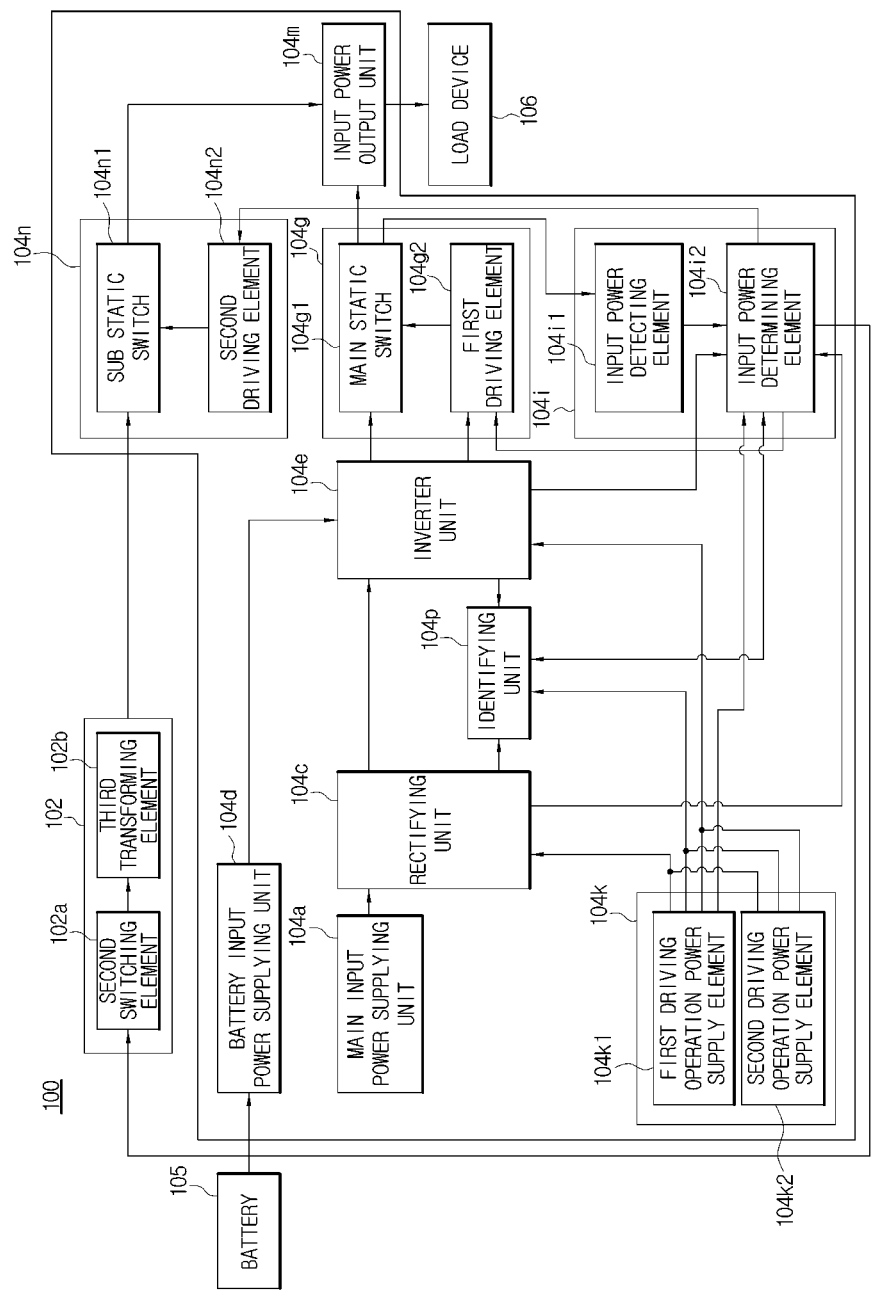
FIG. 3 is a block configuration diagram illustrating another exemplary uninterruptible power supply system according to an embodiment of the present invention.
Figure 4:
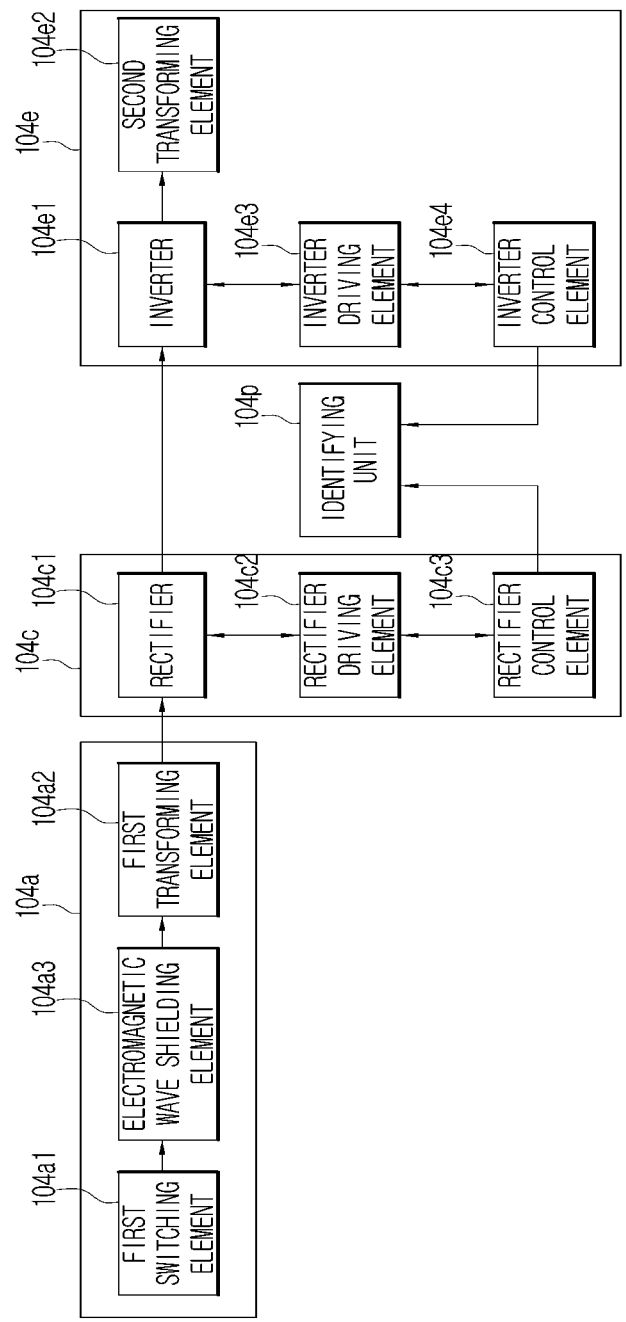
FIG. 4 is a block configuration diagram illustrating another example of a main input power supplying unit, a rectifying unit and an inverter unit illustrated in FIG. 3.

FIG. 3 is a block configuration diagram illustrating another exemplary uninterruptible power supply system according to an embodiment of the present invention. FIG. 4 is a block configuration diagram illustrating another example of a main input power supplying unit, a rectifying unit and an inverter unit illustrated in FIG. 3.

Figure 5:
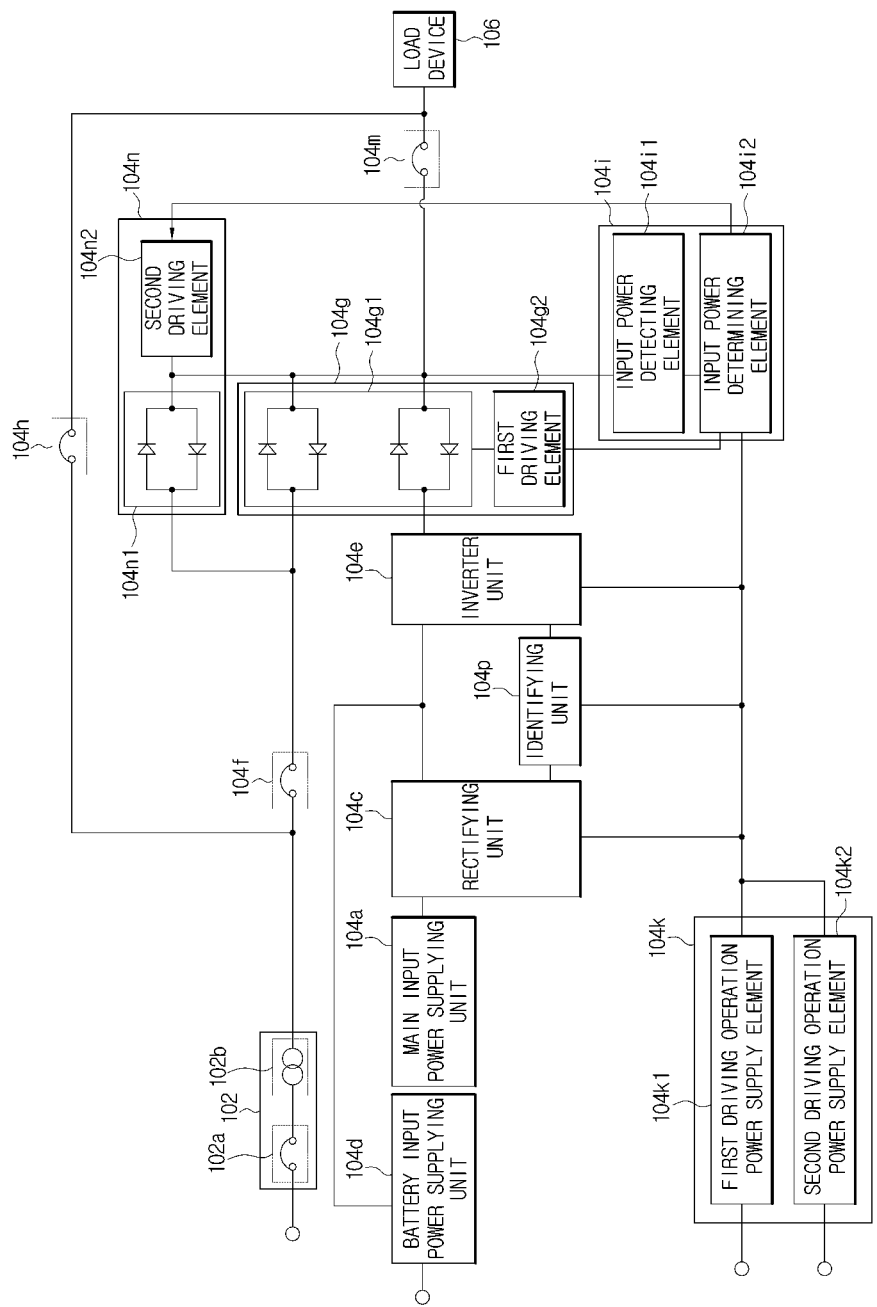
FIG. 5 is an equivalent circuit diagram illustrating another example of a sub power supply device, a main switching unit, a sub switching unit and an input power output unit illustrated in FIG. 3.
Figure 6:
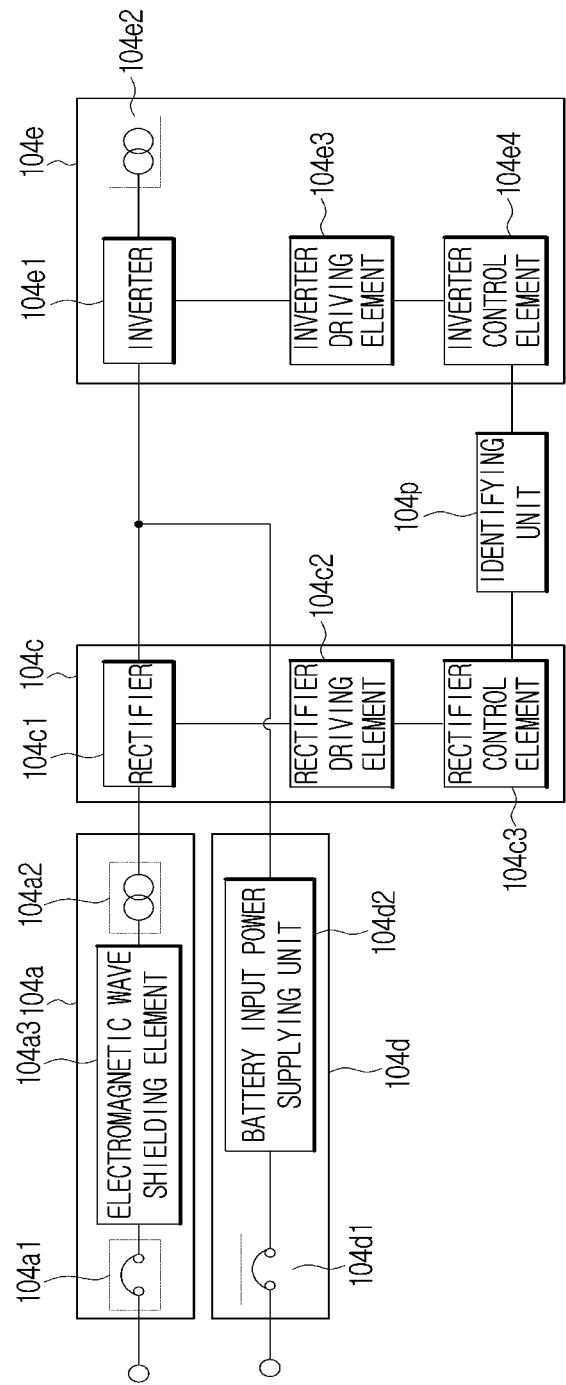
FIG. 6 is an equivalent circuit diagram illustrating another example of a main input power supplying unit, a battery input power supplying unit and an inverter unit illustrated in FIG. 4.

FIG. 5 is an equivalent circuit diagram illustrating another example of a sub power supply device, a main switching unit, a sub switching unit and an input power output unit illustrated in FIG. 3. FIG. 6 is an equivalent circuit diagram illustrating another example of a main input power supplying unit, a battery input power supplying unit and an inverter unit illustrated in FIG. 4.

As illustrated in FIGS. 1 to 6, an uninterruptible power supply system 100 according to an embodiment of the present invention includes a sub power supply device 102, an uninterruptible power supply device 104, a battery 105 and a load device 106.

The sub power supply device 102 supplies or cuts off sub input power to the load device 106.

As an example, as illustrated in FIGS. 3 and 5, the sub power supply device 102 may include a second switching element 102a and a third transforming element 102b.

The second switching element 102a may selectively receive sub input power. The third transforming element 102b may be electrically connected to the second switching element 102a and change a level of sub input power supplied from the second switching element 102a.

Here, the second switching element 102a may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

In this case, the third transforming element 102b may include at least one transformer.

The battery 105 supplies or cuts off battery input power to the load device 106.

As an example, as illustrated in FIG. 6, a battery input power supplying unit 104d may include a third switching element 104d1 and a battery input power supply element 104d2.

Here, the battery input power supply element 104d2 may be electrically connected to an inverter unit 104e and selectively provide battery input power supplied from the battery 105 to the inverter unit 104e through a switching turn on operation of the third switching element 104d1.

In this case, the third switching element 104d1 may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

The uninterruptible power supply device 104 is electrically connected to the sub power supply device 102 and the battery 105.

In this manner, when main input power is selectively received and supplied to the load device 106 or battery input power is selectively received and supplied to the load device 106, the uninterruptible power supply device 104 determines whether the main input power and the battery input power are within a predetermined reference main input power range and reference battery input power range. When the main input power and the battery input power are outside of the reference main input power range and the reference battery input power range, the uninterruptible power supply device 104 receives sub input power and provides the power to the load device 106.

As an example, as illustrated in FIGS. 2, 3 and 5, the uninterruptible power supply device 104 may include a main switching unit 104g, an input power determining unit 104i, a driving operation power supplying unit 104k, an input power output unit 104m and a sub switching unit 104n.

The main switching unit 104g may selectively provide main input power or battery input power.

In this case, the main switching unit 104g may include a main static switch 104g1 and a first driving element 104g2.

The main static switch 104g1 may selectively provide main input power. The first driving element 104g2 may be electrically connected to the main static switch 104g1 and drive such that a switching turn on signal is selectively provided to the main static switch 104g1.

The input power determining unit 104i may determine whether main input power or battery input power output from the main switching unit 104g is outside of the reference main input power range or the reference battery input power range.

In this case, the input power determining unit 104i may include an input power detecting element 104i1 and an input power determining element 104i2.

The input power detecting element 104i1 may be electrically connected to the main switching unit 104g and detect main input power or battery input power output from the main switching unit 104g.

The input power determining element 104i2 may be electrically connected to the input power detecting element 104i1 and determine whether the main input power and the battery input power detected by the input power detecting element 104i1 are outside of the reference main input power range and the reference battery input power range.

The driving operation power supplying unit 104k may be electrically connected to the input power determining unit 104i and provide driving operation power to the input power determining unit 104i.

In this case, the driving operation power supplying unit 104k may include a first driving operation power supply element 104k1 and a second driving operation power supply element 104k2.

One of the first driving operation power supply element 104k1 or the second driving operation power supply element 104k2 may supply driving operation power to the input power determining unit 104i even when one of the first driving operation power supply element 104k1 or the second driving operation power supply element 104k2 is in an abnormal situation.

The input power output unit 104m is electrically connected to the input power determining unit 104i, and when main input power or battery input power is determined by the input power determining unit 104i to be within the reference main input power range or the reference battery input power range, selectively provides main input power or battery input power to the load device 106 by a switching turn on operation of the main switching unit 104g.

In this case, the input power output unit 104m may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

The sub switching unit 104n is electrically connected to the sub power supply device 102 and the input power determining unit 104i.

In this manner, when main input power and battery input power are determined by the input power determining unit 104i to be outside of the reference main input power range and the reference battery input power range and the input power determining unit 104i provides a switching turn off signal to the main switching unit 104g, the sub switching unit 104n receives a switching turn on signal from the input power determining unit 104i, performs a switching turn on operation, and provides sub input power supplied from the sub power supply device 102 to the load device 106 through the input power output unit 104m.

In this case, the sub switching unit 104n may include a sub static switch 104n1 and a second driving element 104n2.

The second driving element 104n2 may be electrically connected to the sub power supply device 102 and the input power determining unit 104i.

In this manner, when main input power and battery input power are determined by the input power determining unit 104i to be outside of the reference main input power range and the reference battery input power range and the input power determining unit 104i provides a switching turn off signal to the main switching unit 104g, the second driving element 104n2 drives such that a switching turn on signal is received from the input power determining unit 104i and a switching turn on operation is performed.

The sub static switch 104n1 may be electrically connected to the sub power supply device 102 and the second driving element 104n2, perform a switching turn on operation by driving of the second driving element 104n2, and supply sub input power supplied from the sub power supply device 102 to the load device 106 through the input power output unit 104m.

Here, the sub static switch 104n1 may be connected in parallel with the main switching unit 104g in a redundant manner.

In this case, a second switching unit 104f may selectively provide sub input power supplied from the sub power supply device 102 to the sub switching unit 104n, and a third switching unit 104h may selectively provide sub input power supplied from the sub power supply device 102 to the load device 106.

As an example, the third switching unit 104h may selectively provide sub input power supplied from the sub power supply device 102 to the load device 106 according to any of an emergency situation, a maintenance situation and an arbitrary situation of a worker.

Here, the second switching unit 104f and the third switching unit 104h may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

Also, as illustrated in FIGS. 2 to 6, the uninterruptible power supply system 100 according to the embodiment of the present invention may further include a main input power supplying unit 104a.

That is, the main input power supplying unit 104a may be electrically connected to the main switching unit 104g, selectively receive main input power and provide the power to the main switching unit 104g.

In this case, as illustrated in FIGS. 4 and 6, the main input power supplying unit 104a may include a first switching element 104a1 and a first transforming element 104a2.

The first switching element 104a1 may selectively receive main input power. The first transforming element 104a2 may be electrically connected to the first switching element 104a1 and change a level of main input power supplied from the first switching element 104a1.

Here, the first switching element 104a1 may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

In this case, the first transforming element 104a2 may include at least one transformer.

Also, as illustrated in FIGS. 4 and 6, the main input power supplying unit 104a of the uninterruptible power supply system 100 according to the embodiment of the present invention may further include an electromagnetic wave shielding element 104a3.

That is, the electromagnetic wave shielding element 104a3 may be electrically connected between the first switching element 104a1 and the first transforming element 104a2.

Also, as illustrated in FIGS. 2 to 6, the uninterruptible power supply system 100 according to the embodiment of the present invention may further include a rectifying unit 104c.

That is, the rectifying unit 104c may be electrically connected to the main switching unit 104g, receive main input power, rectify an AC voltage corresponding to main input power to a DC voltage of an appropriate level, and provide the result to the main switching unit 104g.

In this case, as illustrated in FIGS. 4 and 6, the rectifying unit 104c may include a rectifier 104c1, a rectifier driving element 104c2 and a rectifier control element 104c3.

The rectifier 104c1 may rectify an AC voltage corresponding to main input power to a DC voltage of an appropriate level. The rectifier driving element 104c2 may be electrically connected to the rectifier 104c1 to drive the rectifier 104c1.

The rectifier control element 104c3 may be electrically connected to the rectifier driving element 104c2 and control the rectifier driving element 104c2.

Also, as illustrated in FIGS. 2 to 6, the uninterruptible power supply system 100 according to the embodiment of the present invention may further include the inverter unit 104e.

That is, the inverter unit 104e may be electrically connected to the rectifying unit 104c and the main switching unit 104g, change the DC voltage of an appropriate level that was rectified by the rectifying unit 104c to an AC voltage of an appropriate level, and provide the result to the main switching unit 104g.

In this case, as illustrated in FIGS. 4 and 6, the inverter unit 104e may include an inverter 104e1, a second transforming element 104e2, an inverter driving element 104e3 and an inverter control element 104e4.

The inverter 104e1 may be electrically connected to the rectifying unit 104c and change the DC voltage of an appropriate level that was rectified by the rectifying unit 104c to an AC voltage. The second transforming element 104e2 may be electrically connected to the inverter 104e1 and change the AC voltage that was changed by the inverter 104e1 to an AC voltage of an appropriate level.

In this case, the second transforming element 104e2 may include at least one transformer.

The inverter driving element 104e3 may be electrically connected to the inverter 104e1 to drive the inverter 104e1. The inverter control element 104e4 may be electrically connected to the inverter driving element 104e3 and control the inverter driving element 104e3.

Also, as illustrated in FIGS. 2 to 6, the uninterruptible power supply device 104 of the uninterruptible power supply system 100 according to the embodiment of the present invention may further include an identifying unit 104p.

That is, the identifying unit 104p may be electrically connected to the driving operation power supplying unit 104k and the input power determining unit 104i.

In this manner, the identifying unit 104p receives driving operation power from the driving operation power supplying unit 104k, and when at least one of main input power and battery input power is determined by the input power determining unit 104i to be outside of at least one range of the reference main input power range and the reference battery input power range, identifies an abnormal situation of current input power.

As another example, as illustrated in FIGS. 2 to 6, the uninterruptible power supply device 104 may include the main input power supplying unit 104a, the rectifying unit 104c, the inverter unit 104e, the main switching unit 104g, the input power determining unit 104i, the driving operation power supplying unit 104k, the input power output unit 104m, and the sub switching unit 104n.

The main input power supplying unit 104a may selectively receive main input power.

In this case, the main input power supplying unit 104a may include the first switching element 104a1 and the first transforming element 104a2.

The first switching element 104a1 may selectively receive main input power. The first transforming element 104a2 may be electrically connected to the first switching element 104a1 and change a level of main input power supplied from the first switching element 104a1.

Here, the first switching element 104a1 may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

In this case, the first transforming element 104a2 may include at least one transformer.

Also, the main input power supplying unit 104a of the uninterruptible power supply system 100 according to the embodiment of the present invention may further include the electromagnetic wave shielding element 104a3.

That is, the electromagnetic wave shielding element 104a3 may be electrically connected between the first switching element 104a1 and the first transforming element 104a2.

The rectifying unit 104c may be electrically connected to the main input power supplying unit 104a and rectify an AC voltage corresponding to main input power to a DC voltage of an appropriate level.

In this case, the rectifying unit 104c may include the rectifier 104c1, the rectifier driving element 104c2 and the rectifier control element 104c3.

The rectifier 104c1 may be electrically connected to the main input power supplying unit 104a and rectify an AC voltage corresponding to main input power to a DC voltage of an appropriate level. The rectifier driving element 104c2 may be electrically connected to the rectifier 104c1 to drive the rectifier 104c1.

The rectifier control element 104c3 may be electrically connected to the driving operation power supplying unit 104k to be described below, receive driving operation power from the driving operation power supplying unit 104k, and control the rectifier driving element 104c2.

The battery input power supplying unit 104d may include the third switching element 104d1 and the battery input power supply element 104d2.

Here, the battery input power supply element 104d2 may be electrically connected to the inverter unit 104e and selectively provide battery input power supplied from the battery 105 to the inverter unit 104e through a switching turn on operation of the third switching element 104d1.

In this case, the third switching element 104*d*1 may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

The inverter unit 104*e* may be electrically connected to the rectifying unit 104*c* and change the DC voltage of an appropriate level that was rectified by the rectifying unit 104*c* to an AC voltage of an appropriate level.

In this case, the inverter unit 104*e* may include the inverter 104*e*1, the second transforming element 104*e*2, the inverter driving element 104*e*3 and the inverter control element 104*e*4.

The inverter 104*e*1 may be electrically connected to the rectifying unit 104*c* and change the DC voltage of an appropriate level that was rectified by the rectifying unit 104*c* to an AC voltage. The second transforming element 104*e*2 may be electrically connected to the inverter 104*e*1 and change the AC voltage that was changed by the inverter 104*e*1 to an AC voltage of an appropriate level.

In this case, the second transforming element 104*e*2 may include at least one transformer.

The inverter driving element 104*e*3 may be electrically connected to the inverter 104*e*1 to drive the inverter 104*e*1. The inverter control element 104*e*4 may be electrically connected to the driving operation power supplying unit 104*k* to be described below, receive driving operation power from the driving operation power supplying unit 104*k*, and control the inverter driving element 104*e*3.

The main switching unit 104*g* may be electrically connected to the inverter unit 104*e* and selectively provide the AC voltage of an appropriate level that was changed by the inverter unit 104*e*.

In this case, the main switching unit 104*g* may include the main static switch 104*g*1 and the first driving element 104*g*2.

The main static switch 104*g*1 may be electrically connected to the inverter unit 104*e* and selectively provide the AC voltage of an appropriate level that was changed by the inverter unit 104*e*.

The first driving element 104*g*2 may be electrically connected to the inverter unit 104*e* and the main static switch 104*g*1 and drive such that a switching turn on signal is selectively provided to the main static switch 104*g*1.

The input power determining unit 104*i* may be electrically connected to the rectifying unit 104*c*, the inverter unit 104*e* and the main switching unit 104*g*, and determine whether main input power or battery input power output from at least one of the rectifying unit 104*c*, the inverter unit 104*e* and the main switching unit 104*g* is outside of the reference main input power range or the reference battery input power range.

In this case, the input power determining unit 104*i* may include the input power detecting element 104*i*1 and the input power determining element 104*i*2.

The input power detecting element 104*i*1 may be electrically connected to the main switching unit 104*g* and detect main input power or battery input power output from the main switching unit 104*g*.

The input power determining element 104*i*2 may be electrically connected to the input power detecting element 104*i*1 and determine whether main input power and battery input power detected by the input power detecting element 104*i*1 are outside of the reference main input power range and the reference battery input power range.

The driving operation power supplying unit 104*k* may be electrically connected to the rectifying unit 104*c*, the inverter unit 104*e* and the input power determining unit 104*i* and supply driving operation power to at least one of the rectifying unit 104*c*, the inverter unit 104*e* and the input power determining unit 104*i*.

In this case, the driving operation power supplying unit 104*k* may include the first driving operation power supply element 104*k*1 and the second driving operation power supply element 104*k*2.

One of the first driving operation power supply element 104*k*1 or the second driving operation power supply element 104*k*2 may supply driving operation power to at least one of the rectifying unit 104*c*, the inverter unit 104*e* and the input power determining unit 104*i* even when one of the first driving operation power supply element 104*k*1 or the second driving operation power supply element 104*k*2 is in an abnormal situation.

The input power output unit 104*m* may be electrically connected to the input power determining unit 104*i*, and when main input power or battery input power is determined by the input power determining unit 104*i* to be within the reference main input power range or the reference battery input power range, selectively provide the AC voltage of an appropriate level that was changed by the inverter unit 104*e* to the load device 106 through a switching turn on operation of the main switching unit 104*g*.

In this case, the input power output unit 104*m* may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

The sub switching unit 104*n* may be electrically connected to the sub power supply device 102 and the input power determining unit 104*i*.

In this manner, when main input power and battery input power are determined by the input power determining unit 104*i* to be outside of the reference main input power range and the reference battery input power range and the input power determining unit 104*i* provides a switching turn off signal to the main switching unit 104*g*, the sub switching unit 104*n* receives a switching turn on signal from the input power determining unit 104*i*, performs a switching turn on operation, and provides sub input power supplied from the sub power supply device 102 to the load device 106 through the input power output unit 104*m*.

In this case, the sub switching unit 104*n* may include the sub static switch 104*n*1 and the second driving element 104*n*2.

The second driving element 104*n*2 may be electrically connected to the sub power supply device 102 and the input power determining unit 104*i*.

In this manner, when main input power and battery input power are determined by the input power determining unit 104*i* to be outside of the reference main input power range and the reference battery input power range and the input power determining unit 104*i* provides a switching turn off signal to the main switching unit 104*g*, the second driving element 104*n*2 drives such that a switching turn on signal is received from the input power determining unit 104*i* and a switching turn on operation is performed.

The sub static switch 104*n*1 may be electrically connected to the sub power supply device 102 and the second driving element 104*n*2, perform a switching turn on operation by driving of the second driving element 104*n*2, and supply sub input power supplied from the sub power supply device 102 to the load device 106 through the input power output unit 104*m*.

Here, the sub static switch 104*n*1 may be connected in parallel with the main switching unit 104*g* in a redundant manner.

In this case, the second switching unit 104*f* may selectively provide sub input power supplied from the sub power supply device 102 to the sub switching unit 104*n*, and the third switching unit 104*h* may selectively provide sub input power supplied from the sub power supply device 102 to the load device 106.

As an example, the third switching unit 104*h* may selectively provide sub input power supplied from the sub power supply device 102 to the load device 106 according to any of an emergency situation, a maintenance situation and an arbitrary situation of a worker.

Here, the second switching unit 104*f* and the third switching unit 104*h* may include a fuse and include at least one of a metal-oxide semiconductor field effect transistor (MOSFET), a bipolar junction transistor (BJT), an insulated gate bipolar transistor (IGBT), a gate turn-off (GTO) thyristor and an MOS controlled thyristor (MCT) such that power consumption is decreased by effectively supplying a switching operation voltage when power is supplied in consideration of a switching loss rate when a switching operation is performed.

Also, the uninterruptible power supply device 104 of the uninterruptible power supply system 100 according to the embodiment of the present invention may further include the identifying unit 104*p*.

That is, the identifying unit 104*p* may be electrically connected to the driving operation power supplying unit 104*k* and the input power determining unit 104*i*.

In this manner, the identifying unit 104*p* receives driving operation power from the driving operation power supplying unit 104*k*, and when at least one of main input power and battery input power is determined by the input power determining unit 104*i* to be outside of at least one range of the reference main input power range and the reference battery input power range, identifies an abnormal situation of current input power.

In this manner, the uninterruptible power supply system 100 according to the embodiment of the present invention includes the sub power supply device 102, the uninterruptible power supply device 104, the battery 105 and the load device 106.

Therefore, when main input power and battery input power output from the uninterruptible power supply device 104 are outside of the reference main input power range and the reference battery input power range, the uninterruptible power supply system 100 according to the embodiment of the present invention receives sub input power supplied from the sub power supply device 102 through the uninterruptible power supply device 104 and provides the power to the load device 106.

As an example, when main input power and battery input power output from at least one of the rectifying unit 104*c* and the inverter unit 104*e* in the uninterruptible power supply device 104 are outside of the reference main input power range and the reference battery input power range, the uninterruptible power supply system 100 according to the embodiment of the present invention receives sub input power supplied from the sub power supply device 102 through the sub switching unit 104*n* of the uninterruptible power supply device 104 and provides the power to the load device 106.

As another example, when main input power and battery input power output from the main input power supplying unit 104*a* in the uninterruptible power supply device 104 are outside the reference main input power range and the reference battery input power range, that is, in power-off state or a voltage sag state, the uninterruptible power supply system 100 according to the embodiment of the present invention receives sub input power supplied from the sub power supply device 102 through the sub switching unit 104*n* of the uninterruptible power supply device 104 and provides the power to the load device 106.

Accordingly, the uninterruptible power supply system 100 according to the embodiment of the present invention may receive sub input power and stably supply power to the load device 106 even when main input power and battery input power output from the uninterruptible power supply device 104 are output as abnormal input power.

Also, the uninterruptible power supply system 100 according to the embodiment of the present invention includes the identifying unit 104*p*.

Therefore, the uninterruptible power supply system 100 according to the embodiment of the present invention may identify an abnormal situation of current input power output from the uninterruptible power supply device 104. Accordingly, a maintenance time of the uninterruptible power supply device 104 may decrease and an increase in a maintenance cost may be suppressed.

According to the uninterruptible power supply system of the present invention as described above, the following effects may be obtained. First, even when main input power and battery input power output from the uninterruptible power supply device are output as abnormal input power, power may be stably supplied to the load device by receiving sub input power. Second, since an abnormal situation of current input power output from the uninterruptible power supply device may be identified, a maintenance time of the uninterruptible power supply device may decrease and an increase in a maintenance cost may be suppressed.

It will be understood by those skilled in the art that the invention may be performed in other concrete forms without changing the technological scope and essential features. Therefore, the above-described embodiments should be considered in a descriptive sense only and not for purposes of limitation. The scope of the present invention is defined not by the detailed description but by the appended claims, and encompasses all modifications and alternations derived from meanings, the scope and equivalents of the appended claims.

What is claimed is:

1. An uninterruptible power supply system, comprising:
a sub power supply device configured to supply or cut off sub input power to a load device;
a battery configured to supply or cut off battery input power to the load device; and
an uninterruptible power supply device that is electrically connected to the sub power supply device and the battery, and when main input power is selectively received and supplied to the load device or the battery input power is selectively received and supplied to the load device, determines whether the main input power and the battery input power are within a predetermined reference main input power range and reference battery input power range, and when the main input power and the battery input power are outside of the reference main input power range and the reference battery input power range, receives the sub input power and supplies the power to the load device, wherein the uninterruptible power supply device includes:
a main switching unit configured to selectively provide the main input power or the battery input power;
an input power determining unit configured to determine whether the main input power or the battery input power output from the main switching unit is outside of the reference main input power range or the reference battery input power range;
a driving operation power supplying unit electrically connected to the input power determining unit and configured to supply driving operation power to the input power determining unit;
an input power output unit that is electrically connected to the input power determining unit, and when main input power or battery input power is determined by the input power determining unit to be within the reference main input power range or the reference battery input power range, selectively provides the main input power or the battery input power to the load device by a switching turn on operation of the main switching unit; and
a sub switching unit that is electrically connected to the sub power supply device and the input power determining unit, and when main input power and battery input power are determined by the input power determining unit to be outside of the reference main input power range and the reference battery input power range and the input power determining unit provides a switching turn off signal to the main switching unit, receives a switching turn on signal from the input power determining unit, performs a switching turn on operation, and provides the sub input power supplied from the sub power supply device to the load device through the input power output unit.

2. The system according to claim 1, wherein the main switching unit includes:
a main static switch configured to selectively provide the main input power; and
a first driving element electrically connected to the main static switch and configured to drive such that a switching turn on signal is selectively provided to the main static switch.

3. The system according to claim 1, wherein the input power determining unit includes:
an input power detecting element electrically connected to the main switching unit and configured to detect the main input power or the battery input power output from the main switching unit; and
an input power determining element electrically connected to the input power detecting element and configured to determine whether the main input power and the battery input power detected by the input power detecting element are outside of the reference main input power range and the reference battery input power range.

4. The system according to claim 1, wherein the sub switching unit includes:
a second driving element that is electrically connected to the sub power supply device and the input power determining unit, and when the main input power and the battery input power are determined by the input power determining unit to be outside of the reference main input power range and the reference battery input power range and the input power determining unit provides a switching turn off signal to the main switching unit, drives such that a switching turn on signal is received from the input power determining unit and a switching turn on operation is performed; and
a sub static switch that is electrically connected to the sub power supply device and the second driving element, performs a switching turn on operation by driving of the second driving element, and provides the sub input power supplied from the sub power supply device to the load device through the input power output unit.

5. The system according to claim 4, wherein the sub static switch is connected in parallel with the main switching unit in a redundant manner.

6. The system according to claim 1, further comprising an identifying unit that is electrically connected to the input power determining unit, and when at least one of the main input power and battery input power is determined by the input power determining unit to be outside of at least one range of the reference main input power range and the reference battery input power range, identifies an abnormal situation of current input power.

* * * * *